United States Patent
Choi et al.

(10) Patent No.: US 12,410,284 B2
(45) Date of Patent: *Sep. 9, 2025

(54) CURABLE COMPOSITION AND OPTICAL MATERIAL COMPRISING CURED PRODUCT THEREOF

(71) Applicant: LG CHEM, LTD., Seoul (KR)

(72) Inventors: Hee Jung Choi, Daejeon (KR); Heon Kim, Daejeon (KR); Jaeyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 408 days.

This patent is subject to a terminal disclaimer.

(21) Appl. No.: 17/604,253

(22) PCT Filed: May 21, 2020

(86) PCT No.: PCT/KR2020/006629
§ 371 (c)(1),
(2) Date: Oct. 15, 2021

(87) PCT Pub. No.: WO2020/242129
PCT Pub. Date: Dec. 3, 2020

(65) Prior Publication Data
US 2022/0204701 A1    Jun. 30, 2022

(30) Foreign Application Priority Data

May 24, 2019  (KR) .................. 10-2019-0061428

(51) Int. Cl.
C08G 75/14    (2006.01)
G02B 1/04     (2006.01)

(52) U.S. Cl.
CPC ............. *C08G 75/14* (2013.01); *G02B 1/041* (2013.01)

(58) Field of Classification Search
CPC ... C08L 81/02; C08L 2201/10; C07D 331/02; C08G 75/14; C08G 75/08; C08K 3/06; G02B 1/04; G02B 1/041
See application file for complete search history.

(56) References Cited

U.S. PATENT DOCUMENTS

| 9,283,185 B2 | 3/2016 | Kurzrock et al. | |
| 2007/0241313 A1* | 10/2007 | Kato | G06Q 40/02 252/585 |
| 2010/0130661 A1 | 5/2010 | Takeuchi et al. | |
| 2012/0142889 A1 | 6/2012 | Aoki et al. | |
| 2016/0259091 A1* | 9/2016 | Horita | G02B 1/041 |
| 2017/0362398 A1* | 12/2017 | Tomita | C08L 69/00 |
| 2018/0127549 A1 | 5/2018 | Imagawa et al. | |
| 2018/0291146 A1* | 10/2018 | Monden | C08K 5/005 |

FOREIGN PATENT DOCUMENTS

| CN | 101675082 A | 3/2010 |
| CN | 102459418 A | 5/2012 |
| CN | 103562269 A | 2/2014 |
| CN | 107735428 A | 2/2018 |
| JP | 2001163875 A | 6/2001 |
| JP | 2002-047346 A | 2/2002 |
| JP | 2003119286 A | 4/2003 |
| JP | 2005-239553 A | 9/2005 |
| JP | 2005-272418 A | 10/2005 |
| JP | 2011-225644 A | 11/2011 |
| JP | 2012-147710 A | 8/2012 |
| JP | 2013-028574 A | 2/2013 |
| JP | 2013-124338 A | 6/2013 |
| JP | 2013-124339 A | 6/2013 |
| JP | 2013-227395 A | 11/2013 |
| JP | 2015-199841 A | 11/2015 |

(Continued)

OTHER PUBLICATIONS

Office Action of Japanese Patent Office in Appl'n No. 2021-563122 dated Sep. 5, 2022.

*Primary Examiner* — Shane Fang
(74) *Attorney, Agent, or Firm* — Bryan Cave Leighton Paisner LLP

(57) ABSTRACT

A curable composition comprising an episulfide compound represented by Chemical Formula 1 and an aromatic ring compound containing two or more hydroxyl groups represented by Chemical Formula 2 or 3, and an optical material including a cured product of the curable composition.

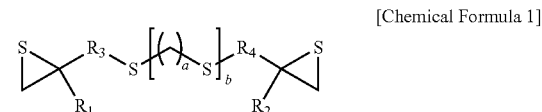

[Chemical Formula 1]

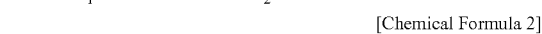

[Chemical Formula 2]

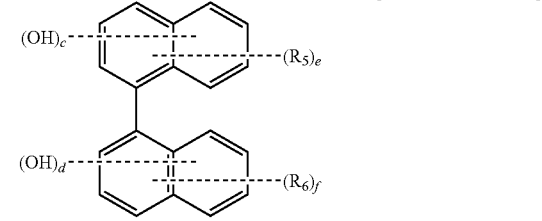

[Chemical Formula 3]

12 Claims, No Drawings

(56) References Cited

FOREIGN PATENT DOCUMENTS

| | | |
|---|---|---|
| JP | 2015-212395 A | 11/2015 |
| JP | 2016-029162 A | 3/2016 |
| JP | 2016-084381 A | 5/2016 |
| JP | 2016-216485 A | 12/2016 |
| JP | 6098112 B2 | 3/2017 |
| KR | 10-1608961 B1 | 5/2016 |
| WO | 2012-147710 A1 | 11/2012 |
| WO | 2013018302 A1 | 2/2013 |

* cited by examiner

CURABLE COMPOSITION AND OPTICAL MATERIAL COMPRISING CURED PRODUCT THEREOF

CROSS-REFERENCE TO RELATED APPLICATION(S)

This application is the U.S. national stage of International Application No. PCT/KR2020/006629 filed on May 21, 2020, which claims the benefit of Korean Patent Application No. 10-2019-0061428 filed on May 24, 2019, the disclosure of which is incorporated herein by reference in its entirety.

FIELD OF DISCLOSURE

The present disclosure relates to a curable composition for forming a high refractive index optical material, and an optical material comprising a cured product thereof.

BACKGROUND

Recently, a device for providing a 3D image to a user by using a virtual reality device and an augmented reality device has been developed. The virtual reality device or the augmented reality device can make desired images visible to a user by forming a diffraction light guide pattern on a lens such as common glasses.

In general, a lens for a virtual reality device or an augmented reality device uses glass having a high refractive index. Glass may have a high refractive index, light transmittance, flatness, strength, and anti-scratch effect, but can cause fatal damage to the user's eyeball when broken, and may cause discomfort from wearing it for a long period of time due to its high density and heavy weight.

On the other hand, in the case of high refractive plastics, the lens is comfortable to wear since it is lighter than a glass lens, the lens is not easily broken and relatively safer than a glass lens even if it is broken, and various colors can be implemented for the lens. However, there are problems for the high refractive plastics that it is difficult to implement a high refractive index and a high Abbe number compared to a glass lens. In addition, there is a problem that glass transition temperature is as low as less than 80° C. Thus, research is needed to improve these properties.

In addition, as the curable solution for forming a high refractive plastic contains a curing agent and/or a catalyst, it shows a tendency that the curing reaction rate increases and the viscosity increases rapidly. For this reason, the curable solution must be consumed in a short time after the curable solution is prepared, and there is a problem that it is difficult to store the remaining solution after use.

SUMMARY

The present disclosure provides a curable composition for forming a high refractive index optical material that can be stored for a long period of time and can prevent a striae phenomenon caused by rapid curing.

The present disclosure also provides an optical material that is lighter than glass or tempered glass used for conventional lenses, and capable of implementing various colors while having excellent strength and hardness, and a high glass transition temperature while realizing a high-refractive index.

In one aspect, there is provided a curable composition comprising: an episulfide compound represented by the following Chemical Formula 1; and an aromatic ring compound containing two or more hydroxyl groups represented by the following Chemical Formulae 2 to 3, wherein a weight ratio of the episulfide compound and the aromatic ring compound containing two or more hydroxyl groups is 7:3 to 9:1.

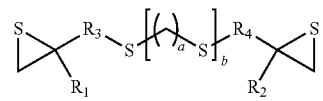

[Chemical Formula 1]

in Chemical Formula 1,
$R_1$ and $R_2$ are each independently hydrogen or an alkyl having 1 to 10 carbon atoms,
$R_3$ and $R_4$ are each independently a single bond or an alkylene having 1 to 10 carbon atoms,
a is an integer of 0 to 4, and
b is an integer of 0 to 6.

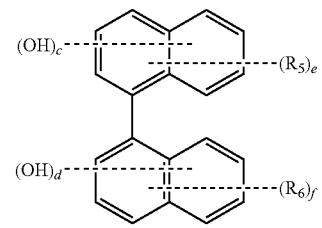

[Chemical Formula 2]

in Chemical Formula 2,
$R_5$ and $R_6$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S,
c and d are each independently an integer of 1 to 7,
e and f are each independently an integer of 0 to 6,
c+e is 7 or less, d+f is 7 or less,

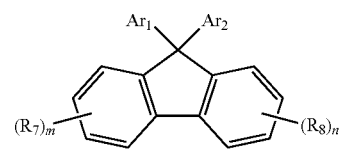

[Chemical Formula 3]

in Chemical Formula 3,
$Ar_1$ and $Ar_2$ are each independently an aryl having 6 to 60 carbon atoms in which one or more hydroxyl groups are substituted.
$R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and
m and n are each independently an integer of 0 to 4.

In another aspect, there is provided an optical material comprising a cured product of an episulfide compound represented by the Chemical Formula 1; and an aromatic ring compound containing two or more hydroxyl groups represented by the Chemical Formula 2 to 3, wherein a weight ratio of the episulfide compound and the aromatic ring compound containing two or more hydroxyl groups is contained in a weight ratio of 7:3 to 9:1.

Hereinafter, the curable composition and the optical material comprising a cured product thereof according to specific embodiments of the present disclosure will be described in more detail.

The terms used herein are used only to describe exemplary embodiments, and are not intended to limit the invention. A singular expression includes a plural expression unless they have definitely opposite meanings in the context.

It should be understood that the terms "comprise", "include", and "have" as used herein are intended to designate the presence of stated features, region, integer, step, action, element and/or component, but does not exclude a possibility of existence or addition of one or more other features, area, integer, step, action, element, component and/or group.

As used herein, the term "episulfide compound" refers to a compound containing one or more episulfides, wherein the episulfide refers to a compound in which the oxygen (O) atom of the epoxide is substituted with a sulfur (S) atom.

As used herein, the "curable" includes both heat-curable and photo-curable, and the "curable composition" means a heat-curable and/or photo-curable composition.

As used herein, the high refractive index means a refractive index of about 1.6 or more at a wavelength ranging from 350 to 800 nm or at a wavelength of 532 nm.

According to an embodiment of the present disclosure, there is provided a curable composition comprising: an episulfide compound represented by the Chemical Formula 1; and an aromatic ring compound containing two or more hydroxyl groups represented by the Chemical Formula 2 to 3, wherein a weight ratio of the episulfide compound and the aromatic ring compound containing two or more hydroxyl groups is 7:3 to 9:1.

Conventionally, it has been confirmed that the refractive index of the optical material, which is a cured product of the curable solution, tends to be higher as the content of sulfur atoms contained in the curable solution is increased, and thus, a thiol compound and the like have been included as a curing agent in the curable solution. However, in the case of a curable solution using a thiol compound, a curing reaction proceeded immediately after mixing, and a viscosity increased rapidly, and a striae phenomenon occurred due to rapid curing. Further, a glass transition temperature was as low as less than 80° C., which caused a problem that physical properties and the like are deteriorated.

The present inventors have found that when the aromatic ring compound containing two or more hydroxyl groups having a specific structure is used instead of a thiol compound, and when the weight ratio of the episulfide compound having a specific chemical structure and the aromatic cyclic compound containing two or more hydroxyl groups is controlled to a specific range, long-term storage of the curable composition is possible by preventing a rapid curing reaction immediately after mixing, and a striae phenomenon caused by rapid curing does not occur, and that the optical material, which is a cured product of such a curable composition, has a very high glass transition temperature of 80° C. or more while exhibiting a high refractive index and excellent optical properties. Consequently, the optical material having excellent mechanical properties, which can replace glass or plastic materials used in the past is provided, and thereby completing the present disclosure.

Accordingly, the curable composition and the optical material containing a cured product thereof can be usefully applied to products or commercial applications, by replacing conventional glass or optical glass, such as display bases, display protective films, touch panels, lenses for wearable devices.

Specifically, the weight ratio of the episulfide compound and the aromatic ring compound containing two or more hydroxyl groups included in the curable composition according to the one embodiment may be 7:3 to 9:1, 7.5:2.5 to 9:1, or 8:2 to 9:1. When the weight ratio of the episulfide compound and the aromatic ring compound containing two or more hydroxyl groups is less than 7:3, the aromatic cyclic compounds containing two or more hydroxyl groups may not be sufficiently dissolved or precipitated in the curable composition, and thus, it is difficult to form a cured product, or even if a cured product is formed, there is a problem that optical and mechanical properties are deteriorated. On the other hand, when the weight ratio exceeds 9:1, uncured by-products and the like are generated as the content of the episulfide compound is relatively increased, which causes a problem that the glass transition temperature of the optical material as the cured product is lowered and the yellowness index (YI) is increased.

The episulfide compound contained in the curable composition may include a compound represented by the following Chemical Formula 1.

[Chemical Formula 1]

in Chemical Formula 1, $R_1$ and $R_2$ are each independently hydrogen or an alkyl having 1 to 10 carbon atoms, $R_3$ and $R_4$ are each independently a single bond or an alkylene having 1 to 10 carbon atoms, a is an integer of 0 to 4, and b is an integer of 0 to 6.

The episulfide compound may contain a high content of sulfur (S) atoms having a large atomic refraction in the molecule due to the above-mentioned specific chemical structure, and the refractive index of the cured product can be increased by such a high content of sulfur atoms.

Further, the episulfide compound can be cured by ring-opening polymerization, and the alkylene sulfide group formed by ring-opening polymerization of the episulfide group can further increase the high refractive index of the cured product.

Meanwhile, in Chemical Formula 4, $R_1$ and $R_2$ may be each independently hydrogen or a methyl group, but are not limited thereto.

Further, $R_3$ and $R_4$ may be each independently a single bond, methylene, ethylene, propylene, isopropylene, butylene, or isobutylene, but is not limited thereto.

Further, a and b may be each independently 0 or 1.

In Chemical Formula 1, a refers to the number of carbon atoms of the alkylene group contained in the thioether repeating unit. If a is too large, the length of the carbon chain in the molecule becomes longer, and the glass transition temperature of the cured product is lowered, which may cause a problem that the heat resistance of the cured product is lowered, and also may cause a problem that the refractive index of the cured product is lowered as the relative sulfur content becomes lower.

In Chemical Formula 1, b is the number of repetition of the thio ether repeating unit in which an alkylene group is connected by a sulfur (S) atom. If b is too large, the length of the carbon chain in the molecule becomes longer, and the glass transition temperature of the cured product is lowered, which may cause a problem that the heat resistance of the cured product is deteriorated.

Further, the compound represented by Chemical Formula 1 may be used alone, or in combination of two or more thereof.

The episulfide compound may include, for example, at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, 1,4-bis(β-epithiopropylthio)butane, etc., but the present disclosure is not necessarily limited thereto.

The content of the episulfide compound may be 50 to 99% by weight, 60 to 95% by weight, or 70 to 90% by weight, based on 100% by weight of the total curable composition. If the content of the episulfide compound is too large, there is a problem that the content of other components such as a cured product is relatively low, and uncured by-products are generated, which lowers the glass transition temperature of the optical material as the cured product and increases the yellowness index (YI). On the other hand, if the content of the episulfide compound is too small, the content of other components such as a curing agent is relatively high, and these are not sufficiently dissolved in the curable composition, or uncured by-products are generated, which causes a problem that the glass transition temperature of the optical material of the cured product is lowered and the yellowness index (YI) is increased.

The aromatic ring compound containing two or more hydroxyl groups included in the curable composition may be a compound represented by the following Chemical Formula 2 or 3.

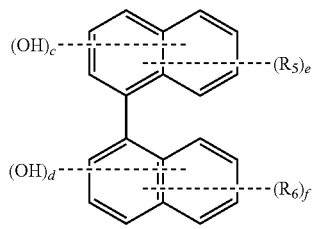

[Chemical Formula 2]

in Chemical Formula 2, $R_5$ and $R_6$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, c and d are each independently an integer of 1 to 7, e and f are each independently an integer of 0 to 6, c+e is 7 or less, d+f is 7 or less,

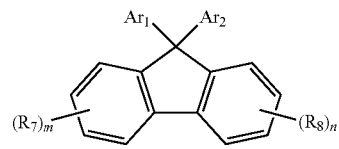

[Chemical Formula 3]

in Chemical Formula 3, $Ar_1$ and $Ar_2$ are each independently an aryl having 6 to 60 carbon atoms in which one or more hydroxyl groups are substituted.

$R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and m and n are each independently an integer of 0 to 4.

Specifically, the aromatic cyclic compound containing two or more hydroxyl groups represented by Chemical Formula 2 has a skeleton to which two naphthalene groups are connected, and one or more hydroxyl groups may be connected to each naphthalene.

On the other hand, the aromatic cyclic compound containing two or more hydroxyl groups represented by Chemical Formula 3 may include two aryl groups substituted with one or more hydroxyl groups at the 9th position of fluorene.

In the aromatic ring compound containing the two or more hydroxyl groups represented by Chemical Formula 2 or 3, in the curing reaction with the episulfide compound, two or more hydroxyl groups undergo a ring-opening polymerization reaction with the episulfide compound to proceed crosslinking. Since the ring-opening polymerization reaction occurs at a reaction rate slower than that of the thiol compound conventionally used as a curing agent, for example, 1/1000, the curing reaction rate can be controlled. Further, in the aromatic ring compound containing two or more hydroxyl groups, the aromatic ring causes the ring-opening polymerization reaction at a reaction rate slower than that of the aliphatic hydroxyl group, for example, 1/2, the curing reaction rate can be controlled. Therefore, it is possible to prevent a rapid curing reaction from occurring even after mixing of the curable composition to control so that the curing reaction does not proceed for more than 7 days under long-term storage, for example, a temperature condition of 0° C., and it is possible to prevent a striae phenomenon caused by rapid curing.

In addition, the aromatic cyclic compound containing two or more hydroxyl groups may implement a high refractive index of a cured product by the conjugation system of aromatic functional groups, and due to such an aromatic functional group, even if the content of the sulfur atom decreases as the thiol compound conventionally used as a curing agent is not included in the curing composition, a decrease in the refractive index can be minimized, and further, the glass transition temperature of the cured product can be increased to 80° C. or more, thus improving mechanical properties.

Meanwhile, in Chemical Formula 2, $R_7$ and $R_8$ may be each independently deuterium, halogen, cyano, nitrile, nitro, amino, methyl, or ethyl, but are not limited thereto.

Further, f and g may each independently be 1 or 2.

Further, h and i may each independently be 0 or 1.

Further, in Chemical Formula 3, $Ar_1$ and $Ar_2$ may be each independently phenyl or naphthalenyl which is substituted with 1 or 2 hydroxyl groups, but are not limited thereto.

Further, $R_9$ and $R_{10}$ may be each independently deuterium, halogen, cyano, nitrile, nitro, amino, methyl, or ethyl, but are not limited thereto.

Further, m and n may be each independently 0 or 1.

Further, the compounds represented by Chemical Formula 2 or 3 may be used alone or in combination of two or more.

The aromatic ring compound containing two or more hydroxyl groups may include, for example, at least one selected from the following compounds.

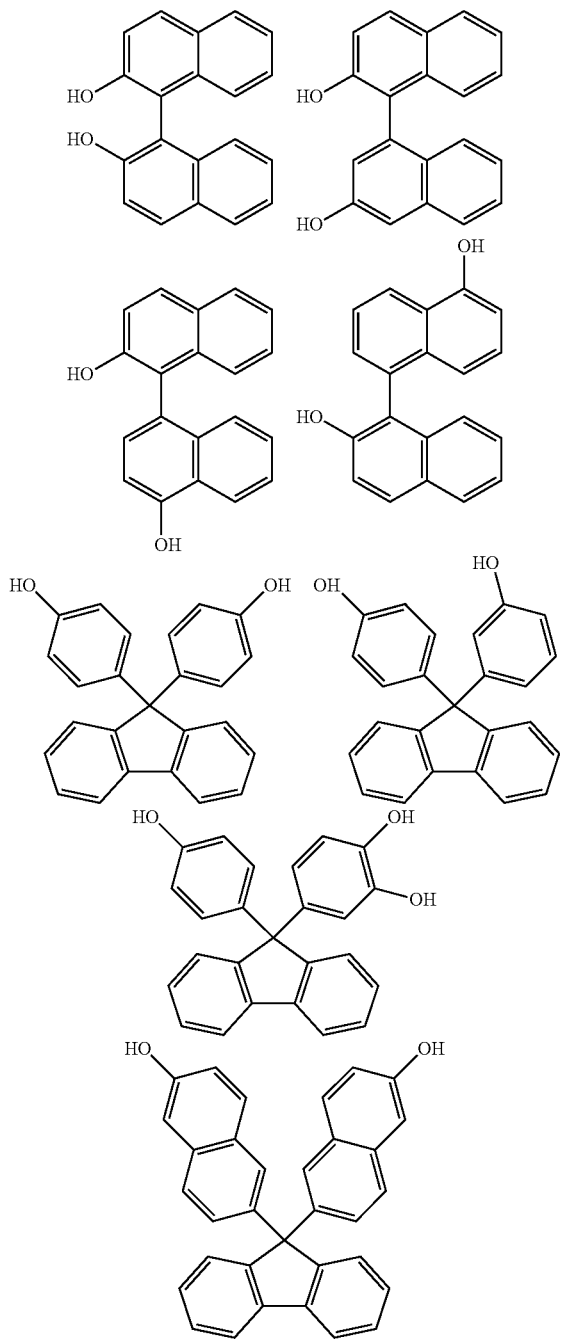
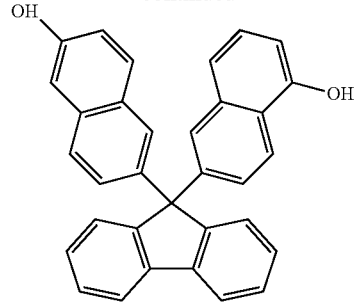
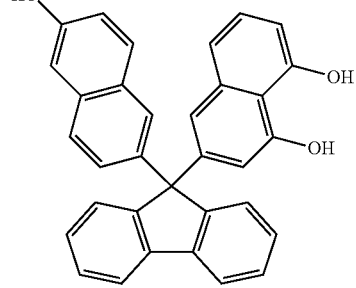

The content of the aromatic cyclic compound containing two or more hydroxyl groups may be 0.1 to 30% by weight, 0.5 to 25% by weight, or 1 to 15% by weight, based on 100% by weight of the total curable composition. If the content of the aromatic cyclic compound containing two or more hydroxyl groups is too large, it may not be sufficiently dissolved or precipitated in the curable composition, and thus, it is difficult to form a cured product, or even if a cured product is formed, there is a problem that optical and mechanical properties are deteriorated. On the other hand, if the content of the aromatic cyclic compound containing two or more hydroxyl groups is too small, uncured by-products and the like are generated as the content of other components such as the episulfide compound is relatively increased, which causes a problem that the glass transition temperature of the optical material as the cured product is lowered and the yellowness index (YI) is increased.

The curable composition according to the one embodiment may further include a catalyst.

The catalyst is not particularly limited as long as it serves to accelerate the curing reaction of the curable composition. Examples thereof include imidazole derivatives such as imidazole, 2-methylimidazole, 2-methylimidazole, 2-ethylimidazole, 2-ethyl-4-methylimidazole, 2-phenylimidazole, 4-phenylimidazole, 1-cyanoethyl-2-phenylimidazole, 1-(2-cyanoethyl)-2-ethyl-4-methylimidazole or the like; amine compounds such as dicyandiamide, benzyldimethylamine, 4-(dimethylamino)-N,N-dimethyl benzylamine, 4-methoxy-N,N-dimethylbenzylamine, 4-methyl-N,N-dimethylbenzylamine, N,N-dicyclohexylmethylamine or the like; hydrazine compounds such as adipic acid dihydrazide and sebacic acid dihydrazide; and phosphorus compounds such as triphenylphosphine. Further, examples of commercially available products include 2MZ-A, 2MZ-OK, 2PHZ, 2P4BHZ, 2P4MHZ manufactured by Shikoku Kasei Kogyo (all are product names of imidazole-based compounds), U-CAT3503N, UCAT3502T manufactured by San Apro (all are product names of blocked isocyanate compounds of dimethylamine), DBU, DBN, U-CATSA102, U-CAT5002 (all are bicyclic amidine compounds and salts thereof), etc.

The content of the catalyst may be 0.001 to 10% by weight, 0.01 to 5% by weight, or 0.1 to 1% by weight, based on 100% by weight of the total curable composition. If the content of the catalyst is too large, the curing reaction proceeds rapidly, there is a problem in handling the curable composition due to overheating, the long-term storage is difficult, and a striae phenomenon may occur. On the other hand, if the content of the catalyst is too small, the optical and mechanical properties may be deteriorated due to uncured.

Further, the curable composition may, in addition to the above, further include other additives used for imparting a specific function to a display substrate in the technical field to which the present disclosure pertains, such as an ultraviolet absorber, a bluing agent, and a pigment.

Further, the curable composition may be stored for a long period of time, and it is possible to suppress a striae phenomenon caused by rapid curing. Specifically, the curable composition has a viscosity measured at room temperature (25° C.) after being held at a temperature of −5 to 0° C. for 12 hours, of 4000 cP or less, 3000 cP or less, 2500 cP or less, 2000 cP or less, 1000 cP or less, 500 cP or less, 300 cP or less, or 100 to 200 cP.

According to another embodiment of the invention, there is provided an optical material comprising a cured product of an episulfide compound represented by the Chemical Formula 1; and an aromatic ring compound containing two or more hydroxyl groups represented by the Chemical Formula 2 to 3, wherein a weight ratio of the episulfide compound and the aromatic ring compound containing two or more hydroxyl groups is contained at a weight ratio of 7:3 to 9:1.

The weight ratio of the episulfide compound and the aromatic ring compound containing two or more hydroxyl groups included in the optical material may be 7:3 to 9:1, 7.5:2.5 to 9:1, or 8:2 to 9:1. If the weight ratio of the episulfide compound and the aromatic ring compound containing two or more hydroxyl groups is less than 7:3, the aromatic ring compound containing two or more hydroxyl groups in the curable composition may not be sufficiently dissolved or precipitated in the curable composition, and thus, the optical and mechanical properties of the optical material as the cured product are deteriorated. On the other hand, if the weight ratio exceed 9:1, uncured by-products and the like are generated as the content of other components such as the episulfide compound is relatively increased, which causes a problem that the glass transition temperature of the optical material as the cured product is lowered and the yellowness index (YI) is increased.

In addition, the episulfide compound and the aromatic ring compound containing two or more hydroxyl groups, the additive and the like which are contained in the optical material are replaced by those described in the above-mentioned photocurable composition.

Such an optical material can be produced by the method of curing the above-mentioned curable composition. Specifically, the above-mentioned curable composition or a uniform composition containing various additives in the curable composition is prepared, and the composition is injected into a mold frame made by combining a mold made of a component such as glass, metal, or polymer resin with a resinous gasket, and then heated and cured. At this time, in order to facilitate the extraction of the finally prepared resin after molding, the mold may be subjected to a release treatment in advance, or a release agent may be further added to the above-described composition for use.

The temperature of the curing reaction may vary depending on the type and content of the compound used. In general, the curing may proceed at about 50 to about 120° C., or about 60 to about 100° C., and the curing time may be about 0.1 to about 72 hours, or about 0.5 to about 24 hours.

The curing reaction may be performed by combining a step of maintaining the above-mentioned predetermined polymerization temperature for a certain period of time, a temperature raising step, a temperature lowering step, and the like. After completion of the reaction, post-treatment can be performed at a temperature condition of about 50 to about 150° C., or about 80 to about 120° C. for about 10 minutes to about 3 hours, thereby preventing deformation.

The optical material released after polymerization may have various functionalities through processes such as dyeing, coating, and the like.

The optical material according to the other embodiment may have a refractive index of 1.65 or more, 1.650 to 1.800, 1.700 to 1.800, or 1.700 to 1.750.

Further, the optical material may have a glass transition temperature of 80° C. or higher, 80 to 150° C., or 85 to 130° C., and may have a very high glass transition temperature.

Further, the optical material may have a very high transmittance, specifically, a transmittance value measured in accordance with JIS K 7361 when the thickness is 1 mm, of 80% or more, 80 to 99%, or 85 to 90%, and.

Further, the optical material may have a very low haze, specifically, a haze value measured according to JIS K 7136 when the thickness is 1 mm, of 1% or less, 0.01 to 1%, or 0.01 to 0.5%.

Further, the optical material may have a yellowness index (YI), specifically, a yellowness index measured according to ASTM E313-1973, of 0.1 to 10, 0.5 to 8, 1 to 7, or 1 to 5, which exhibits low yellowness index.

The optical material according to the other embodiment may be included in the wearable device, and specifically, it can be used in place of glass or tempered glass for a lens of a wearable device.

That is, the optical material has high refractive properties comparable to glass, and also is lighter than glass or tempered glass, and in addition to mechanical properties such as strength and hardness, has excellent optical properties as described above, and thereby, can be used as a lens of a wearable device such as an augmented reality device or a virtual reality device.

In particular, since the optical material has a high glass transition temperature of 80° C. or more, changes in physical properties are minimized in a wearable device in which a high temperature is generated due to continuous video transmission and output, and the optical material can be used stably.

Advantageous Effects

According to the present disclosure, it is possible to provide a curable composition that can be stored for a long period of time and can prevent a striae phenomenon caused by rapid curing, and an optical material comprising a cured product of the curable composition, which is lighter than glass or tempered glass used for conventional lenses and capable of implementing various colors while having excellent strength and hardness, and a high glass transition temperature while realizing a high-refractive index.

DETAILED DESCRIPTION

Hereinafter, the actions and effects of the invention will be described in more detail through specific examples of the invention. However, these examples are for illustrative purposes only, and the scope of rights of the invention is not determined thereby.

Example 1

90 g of the following 70A as an episulfide compound, and 10 g of the following A1 as an aromatic ring compound containing two or more hydroxyl groups were vigorously mixed at 20° C. for 1 hour, and then the mixture was filtered using a glass filter having a pore size of 1 μm and then filtered once again using a PVDF filter having a pore size of 0.45 μm. Then, 1 g of N,N-dicyclohexylmethylamine was added as a catalyst and mixed for 5 minutes to prepare a curable composition.

A 1 mm thick slide glass was placed on both sides of a LCD glass having a size of 10 cm in width and length, and about 5 g of the above-mentioned mixed solution was applied to the center of the LCD glass, and then covered with another LCD glass to prepare a mold. This was put in an oven, and the curing reaction was performed at about 60° C. for about 10 hours and at about 90° C. for about 4 hours. After taken out of the oven, the LCD glass was removed to obtain a flat plastic specimen (optical material). The thickness of the plastic specimen was about 1 mm, and this thickness was measured using a Mitutoyo thickness gauge (Model: ID-C112XBS).

Examples 2 to 7 and Comparative Examples 1 to 3

A curable composition and a plastic specimen (optical material) as a cured product thereof were prepared in the same manner as in Example 1, except that the episulfide compound and the aromatic ring compound containing two or more hydroxyl groups were used in the amount of the compounds shown in Table 1 below. Meanwhile, in the case of Comparative Examples 1 to 3, the following 70A and/or 70B were used as the thiol compounds in the amounts shown in Table 2 below.

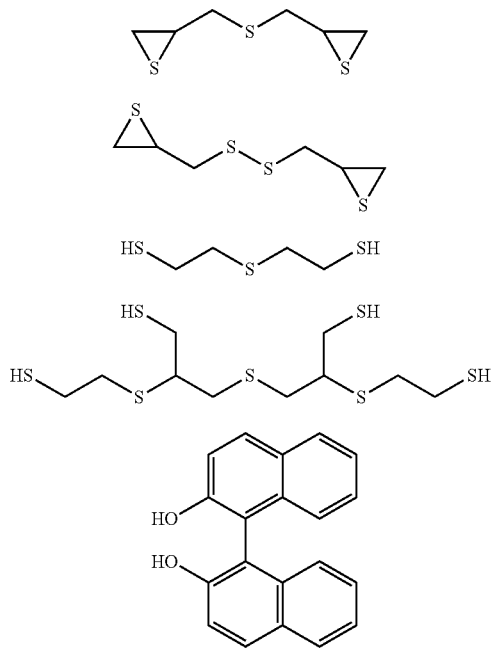

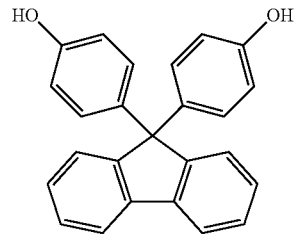

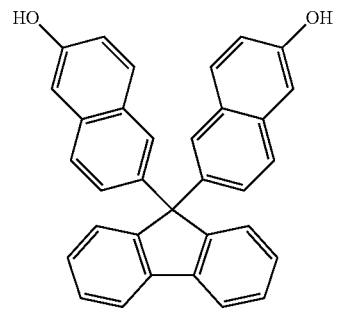

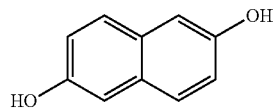

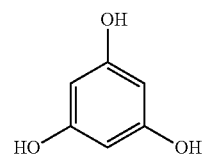

TABLE 1

| (unit: g) | 70A | 74A | 70B | 74B | A1 | A2 | A3 | A4 | A5 |
|---|---|---|---|---|---|---|---|---|---|
| Example 1 | 90 | — | — | — | 10 | — | — | — | — |
| Example 2 | 90 | — | — | — | — | 10 | — | — | — |
| Example 3 | 90 | — | — | — | — | — | 10 | — | — |
| Example 4 | 90 | — | — | — | — | — | — | 10 | — |
| Example 5 | 90 | — | — | — | — | — | — | — | 10 |
| Example 6 | 90 | — | — | — | 8 | — | — | — | 2 |
| Example 7 | 45 | 45 | — | — | 8 | — | — | — | 2 |
| Comparative Example 1 | 90 | — | 10 | — | — | — | — | — | — |
| Comparative Example 2 | — | 90 | — | 10 | — | — | — | — | — |
| Comparative Example 3 | 45 | 45 | 10 | — | — | — | — | — | — |
| Comparative Example 4 | 93 | | | | 7 | | | | |
| Comparative Example 5 | | 95 | | | | 5 | | | |
| Comparative Example 6 | 67 | | | | 33 | | | | |
| Comparative Example 7 | | 65 | | | | 35 | | | |

Evaluation of Physical Properties

1. Evaluation of Optical Properties (Transmittance, Haze and Yellowness Index)

The transmittance, haze, and yellowness index of the sample were measured in the thickness direction of the cured product cured to a 1 mm standard thickness using COH-400 spectrometer manufactured by Nippon Denshoku Industries Co., Ltd., and the results are shown in Table 2 below.

2. Measurement of Sulfur Atom Content

The content of sulfur atoms in the specimen was measured using an elemental analysis method, and the results are shown in Table 2 below.

3. Measurement of Refractive Index

For the specimen, the refractive index value at a wavelength of 532 nm was measured using spectroscopic ellipsometry manufactured by Ellipso Technology, and the results are shown in Table 2 below.

4. Measurement of Glass Transition Temperature (Tg)

The specimen was heated-cooled-heated in a temperature range of 25 to 160° C. at 10° C./min, using a differential scanning calorimeter (DSC) DSC-2500 (TA Instrument), and in the second heating, the glass transition temperature (Tg) of the specimen was measured, and the results are shown in Table 2 below.

TABLE 2

|  | Transmittance (%) | Haze (%) | Yellowness index (YI) | Sulfur atom content (wt. %) | Refractive index | Glass transition temperature (° C.) |
|---|---|---|---|---|---|---|
| Example 1 | 87.7 | 0.3 | 3.5 | 48.54 | 1.736 | 86 |
| Example 2 | 89.0 | 0.3 | 1.7 | 48.54 | 1.701 | 87 |
| Example 3 | 88.1 | 0.4 | 6.2 | 48.54 | 1.717 | 84 |
| Example 4 | 87.8 | 0.3 | 3.4 | 48.54 | 1.700 | 84 |
| Example 5 | 87.6 | 0.3 | 3.7 | 48.54 | 1.681 | 89 |
| Example 6 | 87.5 | 0.3 | 3.7 | 48.54 | 1.724 | 88 |
| Example 7 | 87.7 | 0.3 | 3.4 | 51.70 | 1.740 | 87 |
| Comparative Example 1 | 88.0 | 0.3 | 3.4 | 54.77 | 1.705 | 74 |
| Comparative Example 2 | 87.3 | 0.3 | 3.3 | 60.98 | 1.738 | 75 |
| Comparative Example 3 | 87.7 | 0.3 | 3.4 | 57.93 | 1.734 | 75 |
| Comparative Example 4 | 87.9 | 0.3 | 5.4 | 50.15 | 1.698 | 70 |
| Comparative Example 5 | 87.8 | 0.3 | 4.3 | 58.14 | 1.715 | 68 |
| Comparative Example 6 | N/A | N/A | N/A | N/A | N/A | N/A |
| Comparative Example 7 | N/A | N/A | N/A | N/A | N/A | N/A |

Referring to Table 2, it can be seen that the specimen including the cured product according to Examples of the present disclosure exhibits very high transmittance, and has a relatively high refractive index and a high glass transition temperature even while having low haze and yellowness index value.

On the other hand, it was confirmed that in the case of Comparative Example 1, the refractive index value was slightly lower even while containing a slightly larger amount of sulfur atoms compared to Examples of the present disclosure, and in the case of Comparative Example 2, the transmittance was slightly low. Further, in the case of Comparative Examples 1 to 3, the glass transition temperature was significantly lower than that of Examples, and there was a problem that curing proceeds immediately after preparation of the composition and the viscosity was excessively high, making it difficult to prepare it into a plastic resin specimen or process it into a lens.

In addition, it was confirmed that in the case of the curable compositions of Comparative Examples 4 and 5, the refractive index value was slightly low while containing a slightly larger amount of sulfur atoms, and the glass transition temperature was significantly lower than that of Examples. Furthermore, in the case of the curable compositions of Comparative Examples 6 and 7, it was not possible to manufacture a plastic specimen (optical material), due to problems of poor dissolution or precipitation of the aromatic cyclic compound containing two or more hydroxyl groups, because the content of the aromatic cyclic compound containing two or more hydroxyl groups, which is a solid curing agent, was high.

What is claimed is:

1. A curable composition for forming a high refractive index optical material, the curable composition comprising:
   an episulfide compound represented by the following Chemical Formula 1; and
   an aromatic ring compound containing two or more hydroxyl groups represented by the following Chemical Formula 2 or 3,
   wherein a weight ratio of the episulfide compound and the aromatic ring compound containing two or more hydroxyl groups is 7:3 to 9:1,
   wherein the curable composition does not contain a thiol compound,

[Chemical Formula 1]

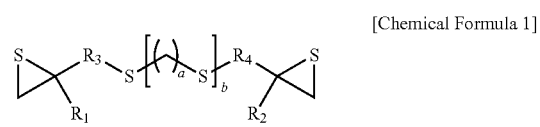

in Chemical Formula 1,
$R_1$ and $R_2$ are each independently hydrogen or an alkyl having 1 to 10 carbon atoms,
$R_3$ and $R_4$ are each independently a single bond or an alkylene having 1 to 10 carbon atoms, a is an integer of 0 to 4, and b is an integer of 0 to 6,

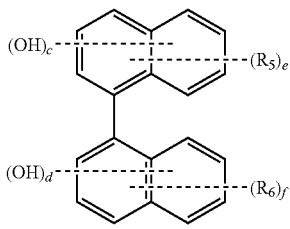

[Chemical Formula 2]

in Chemical Formula 2, $R_5$ and $R_6$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, c and d are each independently an integer of 1 to 7, e and f are each independently an integer of 0 to 6, c+e is 7 or less, d+f is 7 or less, and c+d is 2 or more,

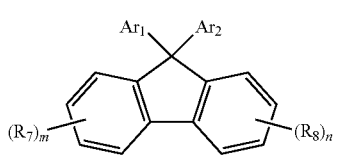

[Chemical Formula 3]

in Chemical Formula 3, $Ar_1$ and $Ar_2$ are each independently an aryl having 6 to 60 carbon atoms including one or more hydroxyl groups, $R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and m and n are each independently an integer of 0 to 4.

2. The curable composition according to claim 1, wherein the weight ratio of the episulfide compound and the aromatic ring compound containing two or more hydroxyl groups is 8:2 to 9:1.

3. The curable composition according to claim 1, wherein the episulfide compound comprises at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio) propane, and 1,4-bis(β-epithiopropylthio)butane.

4. The curable composition according to claim 1, wherein the aromatic ring compound containing two or more hydroxyl groups comprises at least one selected from the following compounds:

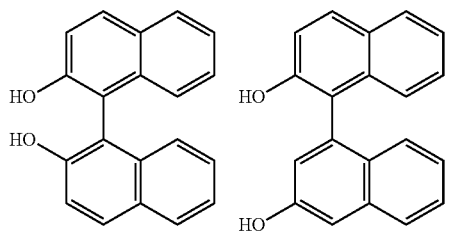

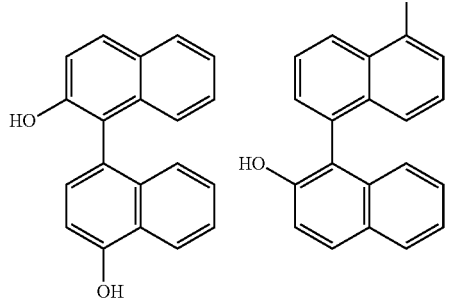

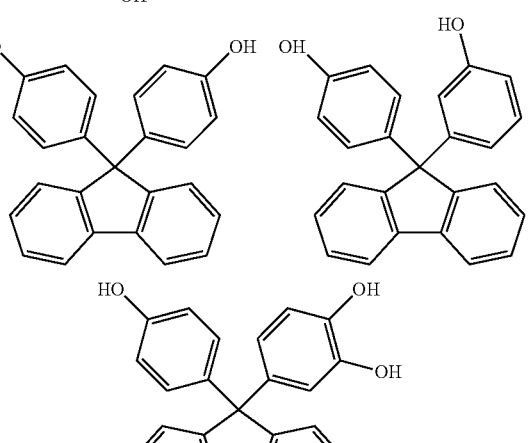

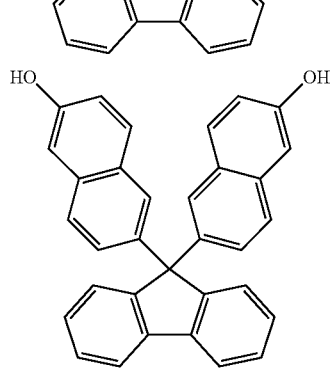

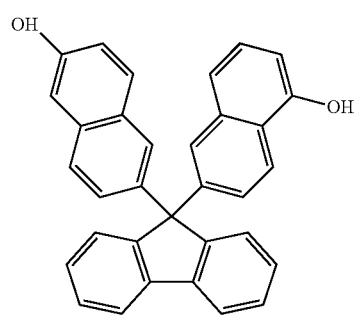

-continued

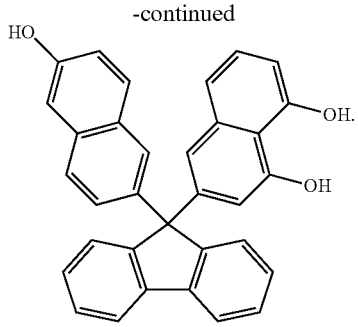

5. The curable composition according to claim 1, wherein the curable composition further comprises a catalyst.

6. An optical material comprising a cured product of a curable composition, the curable composition comprises:
an episulfide compound represented by the following Chemical Formula 1; and
an aromatic ring compound containing two or more hydroxyl groups represented by the following Chemical Formula 2 or 3,
wherein the episulfide compound and the aromatic ring compound containing two or more hydroxyl groups is contained in a weight ratio of 7:3 to 9:1,
wherein the curable composition does not contain a thiol compound,

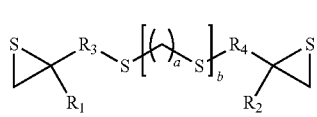

[Chemical Formula 1]

in Chemical Formula 1,
$R_1$ and $R_2$ are each independently hydrogen or an alkyl having 1 to 10 carbon atoms,
$R_3$ and $R_4$ are each independently a single bond or an alkylene having 1 to 10 carbon atoms,
a is an integer of 0 to 4, and
b is an integer of 0 to 6,

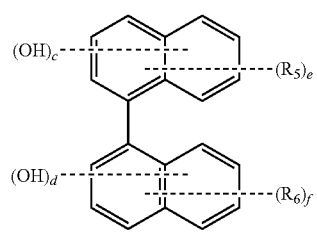

[Chemical Formula 2]

in Chemical Formula 2,
$R_5$ and $R_6$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S,
c and d are each independently an integer of 1 to 7,
e and f are each independently an integer of 0 to 6,
c+e is 7 or less, d+f is 7 or less, and c+d is 2 or more,

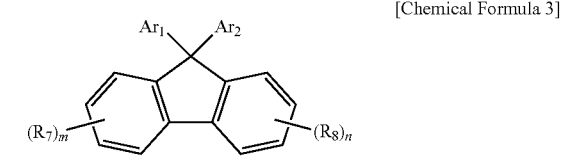

[Chemical Formula 3]

in Chemical Formula 3,
$Ar_1$ and $Ar_2$ are each independently an aryl having 6 to 60 carbon atoms including one or more hydroxyl groups,
$R_7$ and $R_8$ are each independently deuterium, halogen, cyano, nitrile, nitro, amino, an alkyl having 1 to 40 carbon atoms, an alkoxy having 1 to 40 carbon atoms, a cycloalkyl having 3 to 40 carbon atoms, an alkenyl having 1 to 40 carbon atoms, an aryl having 6 to 60 carbon atoms, or a heteroaryl having 1 to 40 carbon atoms containing at least one of O, N, Si and S, and
m and n are each independently an integer of 0 to 4.

7. The optical material according to claim 6, wherein the optical material has a refractive index of 1.65 or more.

8. The optical material according to claim 6, wherein the optical material has a glass transition temperature (Tg) of 80° C. or more.

9. The optical material according to claim 6, wherein the optical material has a transmittance of 80% or more.

10. The optical material according to claim 6, wherein the optical material has a haze of 1% or less.

11. The optical material according to claim 6, wherein the optical material has a yellowness index (YI) of 0.1-10.

12. The optical material according to claim 6, wherein the optical material is for a lens of a wearable device.

* * * * *